US012729009B2

(12) United States Patent
Kiełczykowski et al.

(10) Patent No.: US 12,729,009 B2
(45) Date of Patent: Sep. 8, 2026

(54) RAM AIR TURBINE (RAT) RESTOW PUMP DRIVE SYSTEM

(71) Applicant: Hamilton Sundstrand Corporation, Charlotte, NC (US)

(72) Inventors: Przemysław Kiełczykowski, Kielczow (PL); Damian Adam Słodczyk, Lubliniec (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/086,971

(22) Filed: Mar. 21, 2025

(65) Prior Publication Data

US 2025/0296694 A1 Sep. 25, 2025

(30) Foreign Application Priority Data

Mar. 22, 2024 (EP) .................................... 24461551

(51) Int. Cl.
*B64D 41/00* (2006.01)
*B64F 5/50* (2017.01)
*F04B 17/06* (2006.01)

(52) U.S. Cl.
CPC ............ *B64D 41/007* (2013.01); *F04B 17/06* (2013.01); *B64F 5/50* (2017.01)

(58) Field of Classification Search
None
See application file for complete search history.

(56) References Cited

U.S. PATENT DOCUMENTS 718,001 A * 1/1903 Jones ...................... F16H 37/00 74/625
4,400,143 A * 8/1983 O'Connor .............. F04B 17/06 417/374
4,498,354 A * 2/1985 Walker .................... F04B 9/045 74/625
10,214,297 B2 2/2019 Larson, Jr. et al.
11,858,650 B2 1/2024 Konicek et al.
2016/0288919 A1* 10/2016 Sasscer ................ B64D 41/007
2020/0369404 A1* 11/2020 Sobolak ............... B64D 41/007

FOREIGN PATENT DOCUMENTS

EP 3078595 A1 10/2016

OTHER PUBLICATIONS

European Search Report in connection with counterpart European Patent Application No. 24461551.4 dated Aug. 20, 2024, 9 pages.

* cited by examiner

*Primary Examiner* — Tanzim Imam

(57) ABSTRACT

A drive system for operating a ram air turbine (RAT) re-stow pump assembly includes a pump piston and a cylinder in which the pump piston moves axially in a reciprocating linear motion when driven by the drive system. The drive system includes a rotary drive shaft and a linear link member having a first end connected to the rotary drive shaft and a second end arranged to be connected, in use, to the pump piston of the RAT re-stow pump. Rotation of the drive shaft is translated to reciprocal linear motion of the piston when connected to the link member, via the link member. The drive shaft is provided with an attachment fitting configured to attach to a rotary power tool, in use, to drive rotation of the drive shaft.

20 Claims, 4 Drawing Sheets

R
30
20
10
L
25

20
30
50
10
25

R
20
32
30
50
10
L
25

R
20
30
10
50
L
25

RAM AIR TURBINE (RAT) RESTOW PUMP DRIVE SYSTEM

CROSS-REFERENCE TO RELATED APPLICATION AND PRIORITY CLAIM

This application claims priority under 35 U.S.C. § 119 to European Patent Application No. 24461551.4 filed on Mar. 22, 2024, which is hereby incorporated by reference in its entirety.

TECHNICAL FIELD

The disclosure is concerned with a drive system for a pump assembly for retracting or re-stowing a ram air turbine (RAT) of an aircraft.

BACKGROUND

Ram air turbines (RATs) are small emergency turbines that may be provided in the fuselage or wing of an aircraft to be deployed in the case of failure of a main engine to provide emergency power. The RAT may be manually or automatically deployed, by means of a RAT actuator, into an airstream of the aircraft and rotates in the airstream to generate power for the aircraft. Once deployed, the RAT or RAT actuator is locked in the deployed position by a locking pin or mechanism to avoid the RAT being inadvertently pushed back into the retracted or stowed position by e.g. air forces. Typically, it is not possible to retract/re-stow the RAT during flight and the re-stowing is performed as a ground operation using a hydraulic re-stow pump assembly to provide hydraulic fluid to the RAT actuator to cause it to move in the re-stow direction.

A RAT actuator typically comprises a piston movably located within a hydraulic cylinder. To deploy the RAT, hydraulic fluid is provided to one side of the piston in the cylinder to extend the piston from the cylinder, the free end of the piston being connected to the RAT to deploy the RAT from the body of the aircraft where it has been stowed.

The re-stow pump is attached to the actuator assembly to provide hydraulic fluid to the cylinder on the other side of the piston to retract the piston back into the cylinder and thus to stow the RAT.

There are different types of re-stow pump. Some are driven by being connected to the aircraft's hydraulic system. For smaller aircraft, an electric pump can be used in which an electric switch is operated to control an electrically activated hydraulic solenoid valve that retracts the RAT into its stowed position. More commonly, however, a manual hydraulic pump is used to stow the RAT in a ground operation. Such manual hydraulic pumps require the ground personnel to operate a pump lever to create the hydraulic pressure to drive the pump. Such hydraulic pumps typically have a small displacement and so require extensive manual stroking by repeated strokes of the lever, often requiring over 100 strokes to stow the RAT. This is clearly physically difficult, particularly in harsh weather conditions, and is time and labor intensive.

There is, therefore, a need for a drive system for a RAT re-stow pump that is simple, compact, and quick and easy to operate.

SUMMARY

According to the disclosure there is provided a drive system for a RAT re-stow pump comprising a piston axially moveable in a cylinder to generate pressure by axial movement of the piston pumping hydraulic fluid in the cylinder, the drive system comprising a rotatable drive shaft rotatable about a drive shaft axis and an elongate link member having a first end pivotally connected to the drive shaft and a second end configured to be connected, in use, to the pump piston, such that rotation of the drive member is translated via the link member rotating with and pivoting relative to the drive member to linear movement of the pump piston, and wherein the drive shaft is provided with an attachment fitting configured to be received by and driven by an electric power tool.

The electric power tool may be e.g. a drill e.g. a rotary hand drill or other rotary power tool and may be powered from the mains or may be a cordless power tool.

The attachment fitting may be e.g. a standard hex connector as is commonly used for fitting attachments to power tools.

Also provided is a RAT re-stow pump system having such a drive system, and a RAT assembly with such a pump system.

BRIEF DESCRIPTION

Examples of the RAT re-stow pump drive system will be described with reference to the drawings. It should be noted that variations are possible within the scope of the claims.

DETAILED DESCRIPTION

Figures 1, 2:
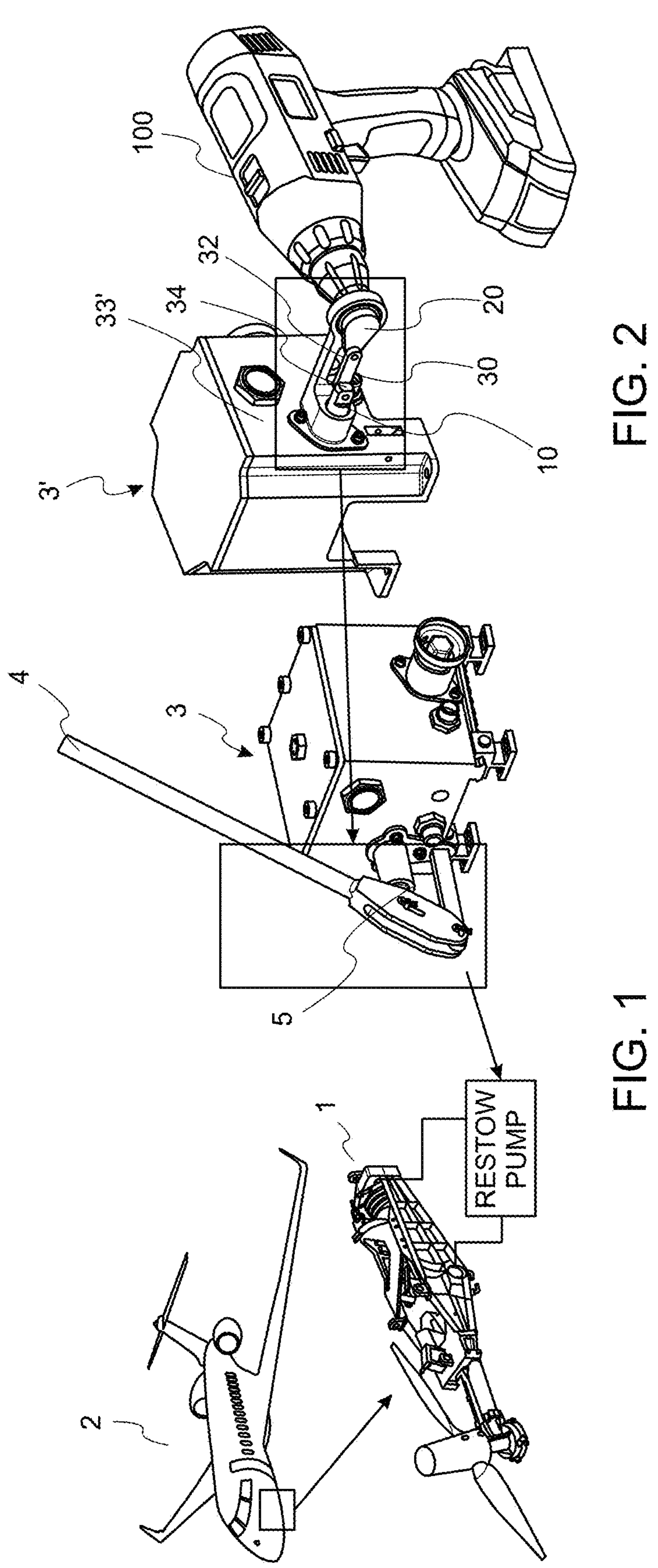
FIG. 1 shows a known RAT assembly and re-stow pump system.
FIG. 2 shows a pump system according to this disclosure.

Referring first to FIG. 1, by way of background, a RAT 1 is shown, which would be stowed in, and deployed from, when needed, an aircraft 2. To re-stow the RAT, a re-stow pump 3 is used which is typically attached to the RAT actuator in a ground operation. The pump 3 operates to provide hydraulic fluid to the RAT actuator to retract the RAT. Conventionally, the pump 3 comprises a pump piston which is axially moveable in and relative to a cylinder to pump hydraulic fluid to the RAT actuator to cause it to retract. The pump piston needs to be caused to reciprocate to generate the necessary hydraulic pressure to move the RAT actuator to stow the RAT. In a conventional pump system as shown in FIG. 1, the reciprocal motion of the pump piston in the cylinder is driven manually by forward and backwards motion of a lever 4 by ground staff. The lever is connected, at 5, to an end of the piston. As mentioned above, such manual operation is laborious and time consuming.

One aspect of the solution provided by the present disclosure is to replace the manual lever with an automated drive system to move the pump piston. An example is shown in FIG. 2 in which the piston 10 in the pump assembly 3' is attached to a rotary drive shaft 20 which is arranged to be rotated by a power tool such as, but not exclusively, a standard cordless electric drill 100, the drive shaft having an attachment fitting, described further below, for attachment to the power tool so that operation of the power tool drives rotation of the drive shaft 20.

The rotary motion of the drive shaft 20 is converted to reciprocal linear motion of the pump piston 10 to which the drive system is attached, in use, by means of a link member 30 attached, at one end 32 to the drive shaft 20 and, at the other end 34 to the pump piston 10.

Figures 3, 4:
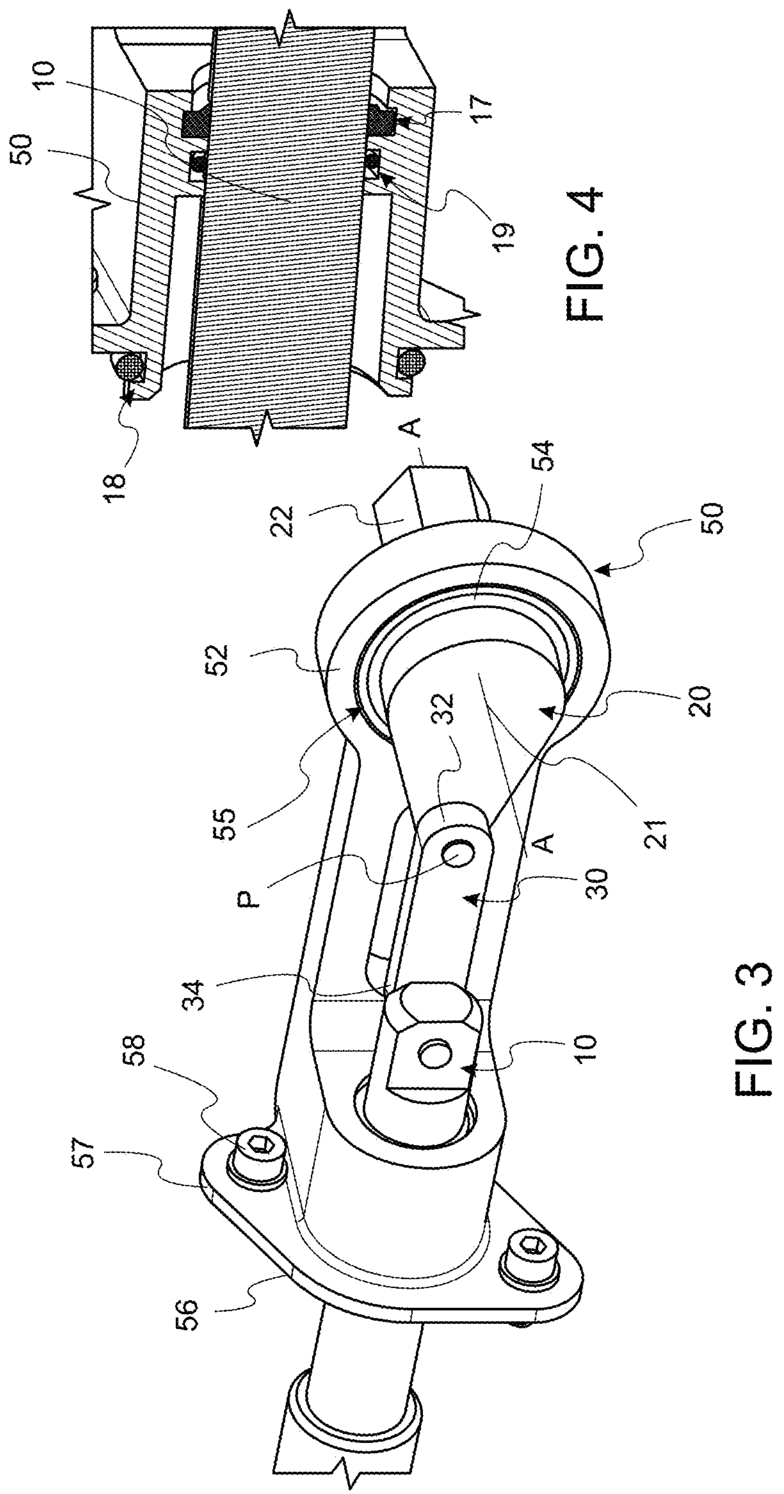
FIG. 3 shows component parts of pump system according to this disclosure.
FIG. 4 shows a section through a housing part of FIG. 3.
Figure 5:
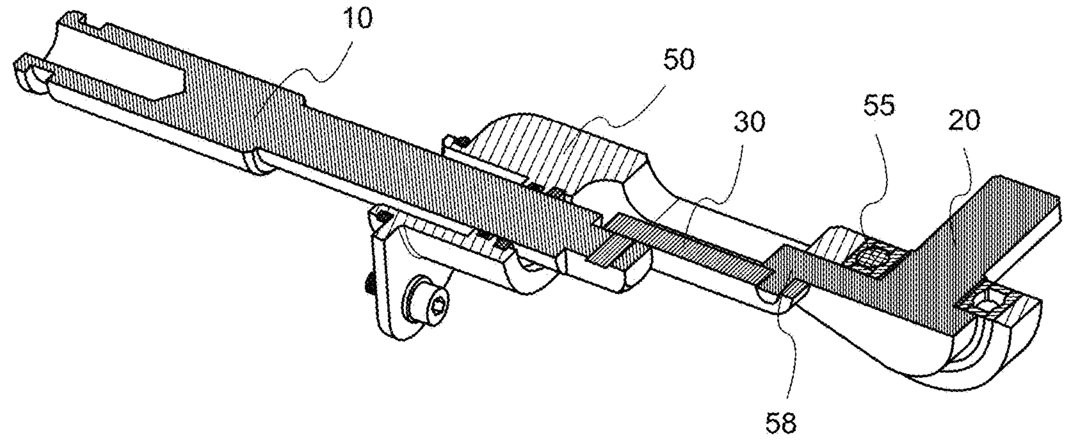
FIG. 5 is a top sectional view of a system as shown in FIG. 3.

The drive system for the pump assembly 3' will now be described in more detail with reference to FIGS. 3 to 5.

The drive system comprises the rotary drive shaft 20 having an attachment fitting 22 configured to be attached to and driven by a rotary power tool such as the drill 100 shown in FIG. 2, and the link member 30 connected, at one end 32, at a pivot point P to the drive shaft 20 and at the other end 34 to an end of the pump piston 10 to be actuated.

In the example shown, the drive system may be supported in a housing 50. The housing 50 may have a first end 52 defining a hole 54 through which the drive shaft 20 extends, the drive shaft having a first end 21 to which the link member 30 is attached and, at the other end, the fitting 22, with the axis A from one end to the other being the axis of rotation of the drive shaft. A bearing 55 may be provided in the hole between the drive shaft and the housing.

The other end 56 of the housing 50 may accommodate the end of the pump piston and support the piston for axial movement relative to the housing. This can be seen in cross-section in FIG. 4. Seals 18, 19 may be provided e.g. where the housing 50 is attached to the pump housing 33' e.g. by means of a flange 57 and e.g. screws 58, and between the piston and the housing. In the example shown, a wiper seal 17 may also be provided at the part of the housing from which the piston extends, to wipe debris from the piston and avoid such debris entering the pump.

In the example shown, the housing 50 may be designed to be attached to the pump housing 33' at the same location where the conventional lever mechanism would have been attached, so that no re-designing of the pump housing is needed, but in other examples, the drive system could be attached to the pump system/housing differently provided the drive system can drive the piston.

The link member 30 is connected to the drive shaft such that the end 32 of the link member rotates with rotation of the drive shaft but also that the link member 30 pivots relative to the drive shaft as the drive shaft rotates. The connection may be by means of a pin at the pivot point P either extending from the drive shaft or from the link member. The other end 34 of the link member is fixed to the end of the pump piston 10 e.g. by a pin 36 from the link member through a hole in the end of the pump piston.

Figure 6:
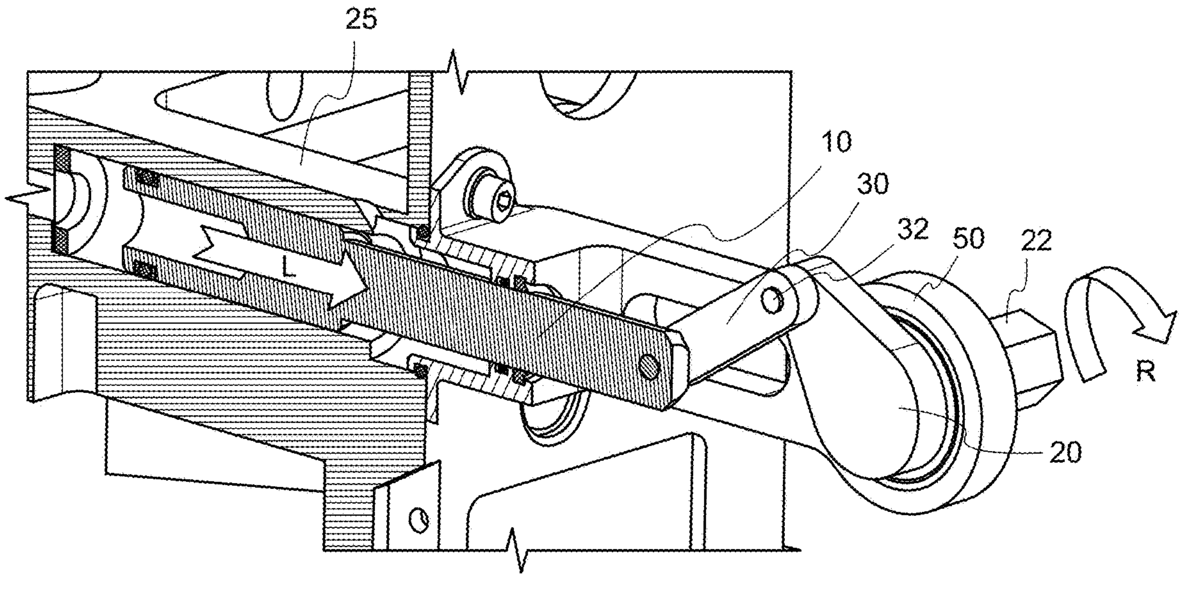
FIG. 6 is a 3D view of a pump system according to this disclosure to illustrate operation.

As seen in the example shown in FIG. 6 the drive shaft, when attached by the fitting 22 to the rotary power tool, is caused to rotate (arrow R) with rotation of the power tool. This causes eccentric rotation of the end 32 of the link member that is attached to the drive shaft, whilst, at the same time, the link member pivots relative to the drive shaft. This motion translates to the other end of the link member drawing the attached piston in a linear motion L, the motion being a reciprocal motion relative to the pump piston cylinder 25, as the drive shaft rotates. In this way, the torque from the power tool is applied to the link member and the piston.

The length of the link member 30 and the size (diameter) of the drive shaft will be selected according to and will define the piston stroke and can be adapted to different applications and requirements provided the required torque (in some examples a torque exceeding 27 Nm which is typically required for the RAT re-stow procedure) is achieved.

The conversion of rotary motion of the drive shaft to linear reciprocal motion of the piston, via the link member, is shown in FIGS. 7A to 7D.

To re-stow the RAT, hydraulic fluid needs to be pumped to the hydraulic actuator by the pump system. This requires reciprocal linear motion of the pump piston. According to this disclosure, this is performed by operation of the drive system—specifically by rotation of the drive shaft 20 which, via the link member 30, is translated to reciprocal linear motion of the pump piston 10, and whereby the drive shaft is rotated by means of a rotary power tool e.g. an electric drill, which attaches to the drive shaft via the attachment fitting 22.

Figures 7A, 7B, 7C, 7D:
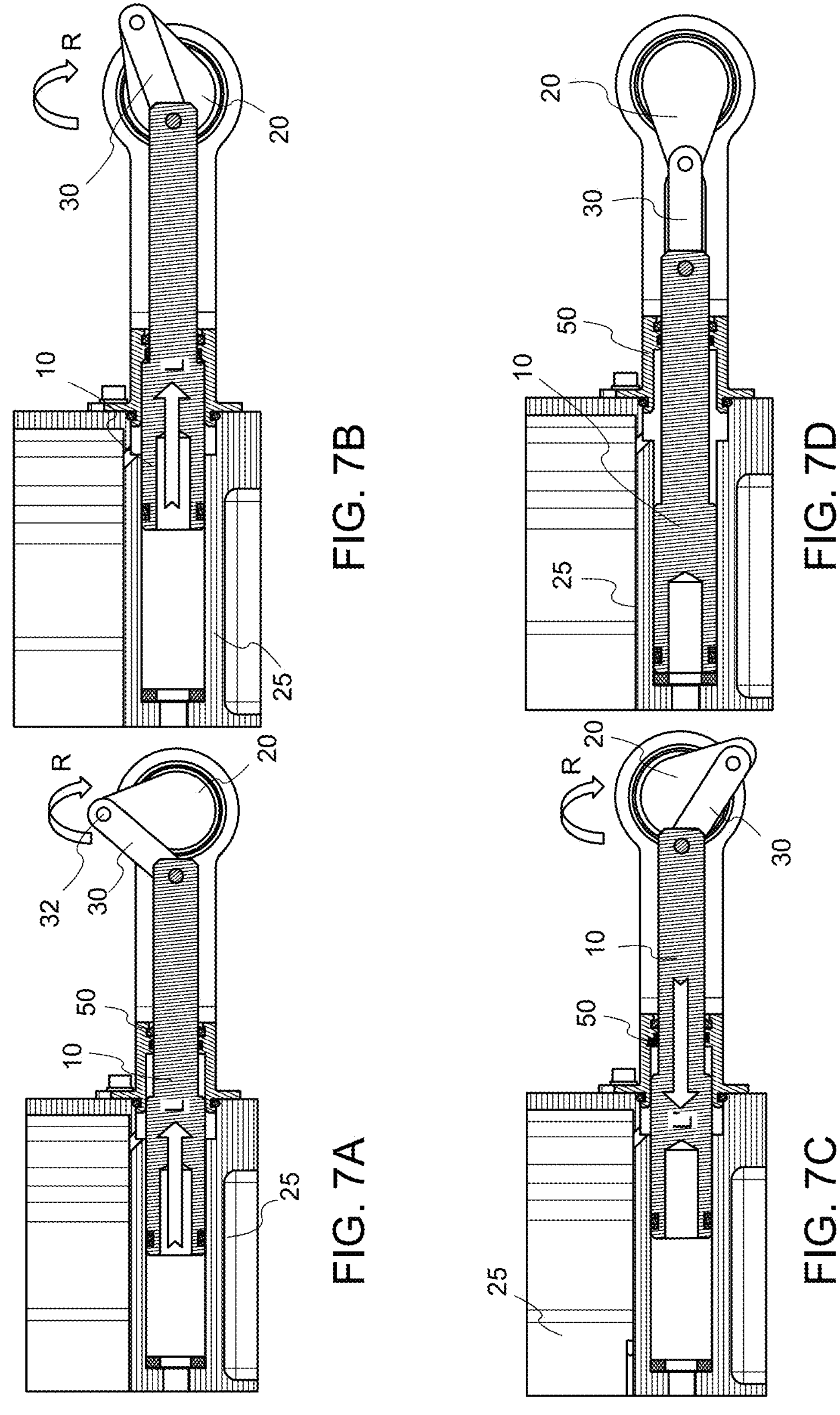
FIGS. 7A to 7D are sectional views to illustrate operation of a pump drive system according to this disclosure.

FIGS. 7A to 7D show an example of a full cycle of operation of the drive system. In FIG. 7A, in this example, the piston 10 is at a first axial position relative to the piston cylinder 25 and the drive system housing 50. At this position, the connection point between the end 32 of the link member 30 and the drive shaft 20 is shown in a first, top position.

As the drive shaft 20 is rotated, by rotation of the power tool, in direction R, the drive shaft 20 draws the end 32 of the link member 30 with it in direction R which causes the other end 34 of the link member to move axially in direction L and also pulls the pump piston 10, connected to that end of the link member, in the axial direction L (FIG. 7B).

As the drive shaft 20 continues to rotate in direction R, it pulls the end 32 of the link member 30 with it which causes the other end 34, fixed to the pump piston, to move axially in the retraction direction L' (FIG. 7C).

Further rotation of the drive shaft in direction R results in further linear motion of the pump piston 10 in direction L' relative to the cylinder 25 (FIG. 7D).

Rotation of the drive shaft 20 continues until the pump has generated sufficient hydraulic pressure to stow the RAT.

Thus, by using rotation of the drive shaft to cause linear reciprocal motion of the pump piston, and by the drive shaft being rotated by means of a power tool connected to the drive shaft, the physical effort and time required to re-stow the RAT is reduced. In an example, for a power tool such as a drill with an operating speed of 2000 rpm, the RAT can be stowed in a matter of seconds, as opposed to minutes required for manual operation of the re-stow pump.

What is claimed is:

1. A drive system for operating a ram air turbine (RAT) re-stow pump assembly comprising a pump piston and a cylinder in which the pump piston moves axially in a reciprocating linear motion when driven by the drive system, the drive system comprising:

a rotary drive shaft;

a linear link member having a first end connected to the rotary drive shaft and a second end arranged to be connected, in use, to the pump piston of the RAT re-stow pump assembly, the link member configured such that rotation of the drive shaft is translated to reciprocal linear motion of the piston when the piston is connected to the link member;

wherein the drive shaft is provided with an attachment fitting configured to attach to a rotary power tool, in use, to drive rotation of the drive shaft; and wherein the linear link member is connected to the drive shaft such that the first end of the linear link member rotates with rotation of the rotary drive shaft but also that the linear link member pivots relative to the rotary drive shaft as the rotary drive shaft rotates.

2. The drive system of claim 1, further comprising:

a drive system housing having a first end configured to receive the drive shaft and a second end configured to accommodate, in use, the pump piston for linear movement thereof.

3. The drive system of claim 2, wherein the first end of the drive system housing defines a hole through which the drive shaft passes.

4. The drive system of claim 3, further comprising:

a bearing in the hole between the drive shaft and the drive system housing.

5. The drive system of claim 2, wherein the second end of the drive system housing is configured to be attached to a housing of the pump assembly.

6. The drive system of claim 5, wherein the second end of the drive system housing comprises a flange for attachment to the housing of the pump assembly.

7. The drive system of claim 1, wherein the first end of the link member is attached to the drive shaft by a pin about which the link member pivots as the drive shaft rotates.

8. The drive system of claim 1, wherein the second end of the link member is connected to the piston, in use, by a fixed pin connection.

9. The drive system of claim 1, wherein the attachment fitting is a hex connector.

10. The drive system of claim 1, further comprising a power tool.

11. The drive system of claim 10, wherein the power tool is an electric drill.

12. The drive system of claim 10, wherein the power tool is a cordless power tool.

13. A ram air turbine (RAT) re-stow pump assembly comprising:

a pump assembly housing configured to accommodate a pump piston reciprocally linearly moveable within a cylinder; and a drive system comprising:

a rotary drive shaft;

a linear link member having a first end connected to the rotary drive shaft and a second end connected to the pump piston, the link member configured such that rotation of the drive shaft is translated to reciprocal linear motion of the piston;

wherein the linear link member is connected to the rotary drive shaft such that the first end of the linear link member rotates with rotation of the rotary drive shaft but also that the linear link member pivots relative to the rotary drive shaft as the rotary drive shaft rotates; and wherein the drive shaft is provided with an attachment fitting configured to attach to a rotary power tool, in use, to drive rotation of the drive shaft.

14. The RAT re-stow pump assembly of claim 13, wherein the drive system further comprises a drive system housing having a first end configured to receive the drive shaft and a second end configured to accommodate the pump piston for linear movement thereof.

15. The RAT re-stow pump assembly of claim 14, wherein the first end of the drive system housing defines a hole through which the drive shaft passes.

16. The RAT re-stow pump assembly of claim 15, wherein the drive system further comprises a bearing in the hole between the drive shaft and the drive system housing.

17. The RAT re-stow pump assembly of claim 14, wherein:

the second end of the drive system housing is configured to be attached to the pump assembly housing; and the second end of the drive system housing comprises a flange for attachment to the pump assembly housing.

18. The RAT re-stow pump assembly of claim 13, wherein:

the first end of the link member is attached to the drive shaft by a pin about which the link member pivots as the drive shaft rotates; and the second end of the link member is connected to the piston by a fixed pin connection.

19. A ram air turbine (RAT) assembly comprising:

a RAT;

a RAT actuator; and a RAT re-stow pump assembly configured to re-stow the RAT via the RAT actuator, wherein the RAT re-stow pump assembly comprises:

a pump assembly housing configured to accommodate a pump piston reciprocally linearly moveable within a cylinder; and a drive system comprising:

a rotary drive shaft; and a linear link member having a first end connected to the rotary drive shaft and a second end connected to the pump piston, the link member configured such that rotation of the drive shaft is translated to reciprocal linear motion of the piston;

wherein the linear link member is connected to the rotary drive shaft such that the first end of the linear link member rotates with rotation of the rotary drive shaft but also that the linear link member pivots relative to the rotary drive shaft as the rotary drive shaft rotates; and wherein the drive shaft is provided with an attachment fitting configured to attach to a rotary power tool, in use, to drive rotation of the drive shaft.

20. The RAT assembly of claim 19, wherein:

the drive system further comprises a drive system housing having a first end configured to receive the drive shaft and a second end configured to accommodate the pump piston for linear movement thereof, the first end of the drive system housing defines a hole through which the drive shaft passes; and the second end of the drive system housing comprises a flange for attachment to the pump assembly housing;

the first end of the link member is attached to the drive shaft by a pin about which the link member pivots as the drive shaft rotates; and the second end of the link member is connected to the piston by a fixed pin connection.

* * * * *